United States Patent
Faris

(10) Patent No.: US 7,116,857 B2
(45) Date of Patent: *Oct. 3, 2006

(54) OPTOMECHANICAL SWITCH USING LASER OR LIGHT MOVABLE LIQUID CRYSTAL

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 10/730,484

(22) Filed: Dec. 8, 2003

(65) Prior Publication Data

US 2005/0123233 A1    Jun. 9, 2005

(51) Int. Cl.
G02B 6/26    (2006.01)
G02B 6/42    (2006.01)

(52) U.S. Cl. .................. 385/18; 385/16; 359/872; 359/877; 349/62

(58) Field of Classification Search .......... 385/16, 385/18; 359/872, 877
See application file for complete search history.

(56) References Cited

U.S. PATENT DOCUMENTS

| | | | | |
|---|---|---|---|---|
| 4,626,073 A | * | 12/1986 | Amstutz et al. | 349/155 |
| 5,641,836 A | | 6/1997 | Carter et al. | 525/152 |
| 6,075,239 A | * | 6/2000 | Aksyuk et al. | 250/229 |
| 6,312,770 B1 | * | 11/2001 | Sage et al. | 428/1.1 |
| 6,526,198 B1 | | 2/2003 | Wu et al. | 385/18 |
| 6,778,722 B1 | * | 8/2004 | Klocek et al. | 385/16 |
| 2003/0098945 A1 | * | 5/2003 | Sugimoto et al. | 349/172 |
| 2004/0057002 A1 | * | 3/2004 | Nishiyama et al. | 349/129 |

OTHER PUBLICATIONS

PCT ISA, PCT/US2004/30160.
Cviklinski et al., Eur. Phys. J. E. 9, 427-434 (2002), "UV isomerisation in nematic elastomers sa a route to photo-mechanical transducer".
Jamieson, New Scientist Mar. 22, 2003, 18, "Crystal swims like a fish to escape from laser light".
Finkelmann et al., Phys. Rev. Let., vol. 87, No. 1, pp. 015501-1 through 015501-4, "A New Opto-mechanical Effect in Solids".
Hogan et al., Phys. Rev. E. vol. 65, 041720-1 through 041720-10, "uv manipulation of order and macroscopic shape in nematic elastomers".

* cited by examiner

*Primary Examiner*—Akm Enayet Ullah
*Assistant Examiner*—Daniel Petkovsek

(57) ABSTRACT

An optomechanical switch comprised of light or laser movable liquid crystal is disclosed. The optomechanical switch consists of a plate of light movable liquid crystal rotatably disposed with respect to a substrate. When activated with a light or laser source, the light movable liquid crystal is rotated angularly to create transmissive and reflective states of transmission for the optical beam.

14 Claims, 2 Drawing Sheets

OPTOMECHANICAL SWITCH USING LASER OR LIGHT MOVABLE LIQUID CRYSTAL

TECHNICAL FIELD

The present invention relates to liquid crystal elastomers and more specifically to nematic liquid crystal elastomers which are laser or light movable and an opto-mechanical switch.

BACKGROUND ART

Recently, the unique behavior of liquid crystal elastomers have been examined. Among the remarkable properties of these liquid crystal elastomers is that some of the liquid crystal materials have the property of changing their shape by up to 400%. Other developments have shown some liquid crystal elastomers can be considered laser or light movable liquid crystals. This opto-mechanical effect can be controllable and reversible and reproducible. All variables are important criteria for developing commercially viable applications taking advantage of the unique properties of these liquid crystal elastomers.

Properly designed liquid crystalline elastomers can exhibit very strong opto-mechanical or photo-mechanical effects. The phenomena is discussed more extensively by H. Finkelman, et al. "A New Opto-Mechanical Effect in Solids," *Physical Review* Letters, Vol. 87, No. 1, 015501-1 (Jul. 2, 2001), which is herein fully incorporated by reference.

It has been shown that the proper design of the liquid crystal elastomer materials depends on the nematic order of those crystals which are molecular shaped materials which can be oriented in certain ways based on electric currents. Specifically, twisted nematic liquid crystals can be oriented by electrical currents.

For purposes of this specification, a properly designed liquid crystal elastomer which exhibits the photomechanical effect will be called a Light Moveable Liquid Crystal ("LMLC"). The LMLC is approximately several micrometers in size. The LMLC is a nematic elastomer which can change its shape by 400%.

To illustrate the unique properties of the LMLC, attention is directed to FIG. 1, which illustrates a single LMLC and its effect after application of a light or laser source. Referring to FIG. 1, there is shown a LMLC 1, after application of laser or light source 5, and the movement of the LMLC when light or laser is incident upon its surface. The LMLC 1 physically bends when it absorbs light and is seen to be "moving."

FIG. 2 illustrates that the LMLC 1 can be rotated depending upon the angle of incidence of the light source. The LMLC may be arranged to move in circular or elliptical fashion. Based on the angle of incidence of the laser beam, LMLC will gain angular momentum, causing circular or elliptical motion.

Various uses for actual commercial devices employing LMLCs have been suggested, but none have been fully disclosed. Specifically, the invention disclosed proposes an optomechanical switch which can be used in conjunction with free space optics or with waveguides.

Such commercially viable applications of such light or laser movable liquid crystal ("LMLC") have not heretofore been developed.

SUMMARY OF THE INVENTION

The above-discussed and other problems and deficiencies of the prior art are overcome or alleviated, and the objects of the invention are attained, by the several methods and apparatus of the present invention.

In one aspect, the invention is an optomechanical switch for transmitting an optical beam comprising: a substrate; a signal source capable of transmitting a radiation signal; and a LMLC on said substrate positionable between a first position and a second position upon activation with said signal source.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, wherein:

FIG. 4(*b*) is a schematic diagram of an optomechanical switch in a transmissive state in accordance with the principles of the invention.

DETAILED DESCRIPTION OF THE DRAWINGS

Figure 3:
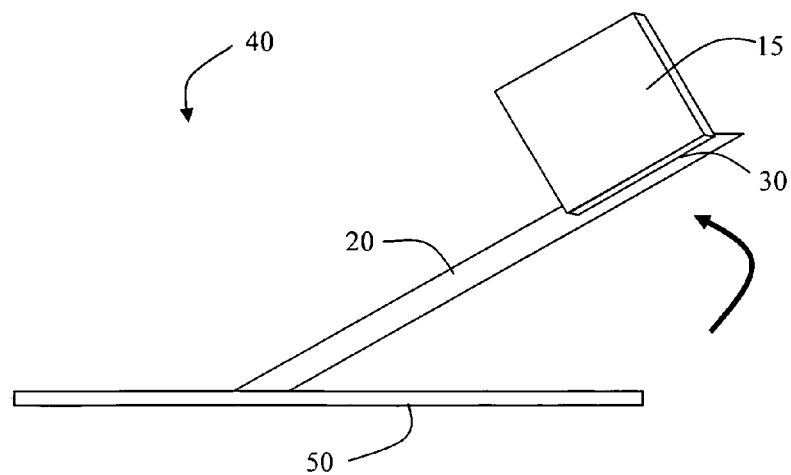
FIG. 3 is a schematic diagram of an optomechanical switch in accordance with the principles of the invention.

Various optical switches and switching devices may be formed by utilizing the unique properties of the LMLC. Referring to FIG. 3, there is shown a LMLC optical switch in accordance with the principles of the invention which takes advantage of the optomechanical switch.

Optomechanical switches offer many advantages over electro-optical switches. Typically, optomechanical switches involves physical motion of some optical elements. Electrooptic switches, on the other hand, employ a change of refractive index to perform optical switching. The change of refractive index is typically accomplished by electrooptic or thermo-optic effects.

Generally optomechanical switches feature lower insertion loss, and lower crosstalk and higher isolation between the ON and OFF states. The switches of the present invention can also be made bi-directional further realizing savings on valuable chip real estate. Optomechanical switches, unlike electrooptic switches, are also independent of optical wavelengths, polarization and data modulation format. The crosstalk of electro-optic waveguide switches is limited to a range above −30 dB, and can often be in the range of −10 to −15 dB.

An optomechanical switch can be implemented either in free space, in fibers or in waveguides. An optomechanical free space switch is disclosed in the invention. Referring to FIG. 3, there is shown a free space optical switch 40 in accordance with the principles of the invention.

The optical switch 40 consists of a plate 20 employing LMLCs and an integrated vertical micromirror 15. The vertical micromirror is integrated with the plate 20 by microhinges 30. The microhinges are any suitable microelectromechanical devices which can allow pivoting of the micromirror with respect to the plate 20. One such microhinge is disclosed by Wu, et al. in "Micromachined Freespace Integrated Micro-optics," Sensors and Actuators, vol. 50, pp. 127–134 (1995), which is herein fully incorporated by reference. The switch is assembled on a substrate 50 which can comprise of Silicon, Silicon on Insulator, or Glass. In a preferred embodiment, the substrate is comprised of a multi layer substrate, as disclosed by the assignee in co-pending U.S. patent application Ser. No. 10/717,220 filed on Nov. 19, 2003, entitled "Method of Fabricating Multi Layer MEMS and Microfluidic Devices."

Figure 4A:
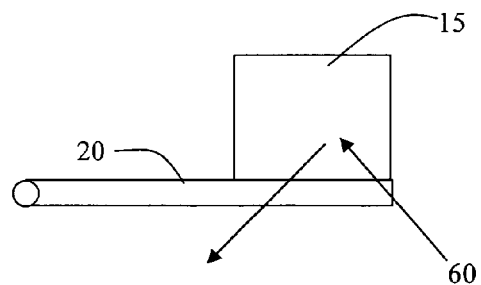
FIG. 4(*a*) is a schematic diagram of an optomechanical switch in a reflective state in accordance with the principles of the invention.
Figure 4B:
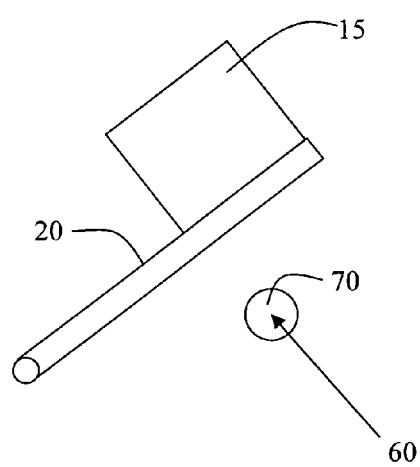

Referring to FIGS. 4(a) and 4(b), there is shown the switch 40 of the invention in operation. An input optical beam 60 is incident at a 45 degree angle with respect to the normal direction of the micromirror 15. By pivoting the plate 20 (which is made of LMLCS), the micromirror 15 is controllably moved in and out of the optical path. The pivoting of the plate produces a switching between the reflection and transmission directions. FIG. 4(a) shows the switch 40 in reflective state while FIG. 4(b) illustrates the switch 40 in transmissive state configured with a detector 70. The detector can be configured along with the switch 40 of the invention, or optionally can be further configured for detecting the optical beam at a later transmitted site.

Figure 1:
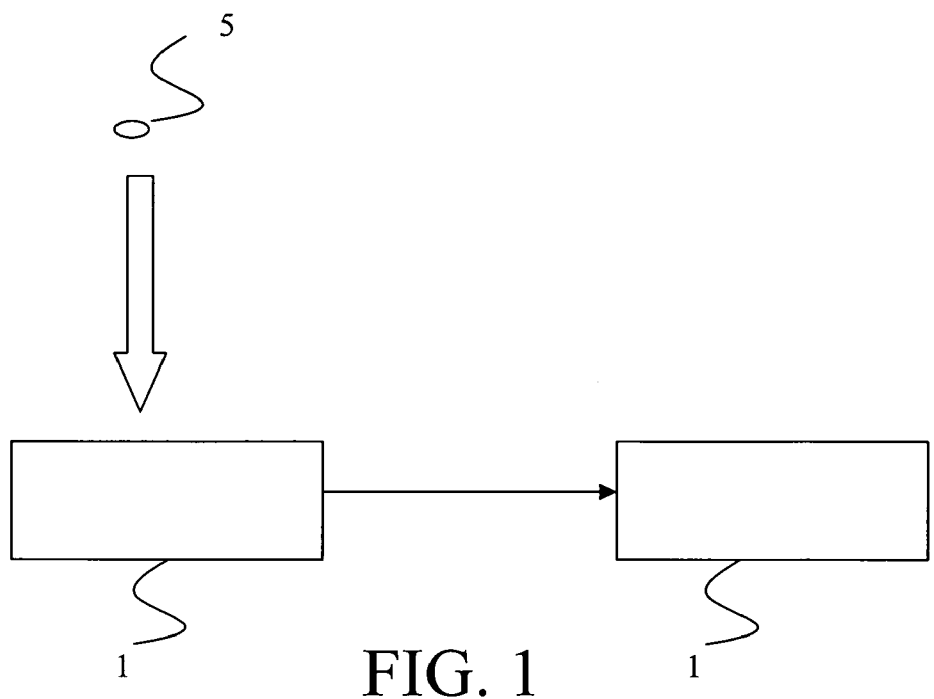
FIG. 1 is a schematic diagram of a light or laser movable liquid crystal and its effect upon radiation by a light or laser source.
Figure 2:
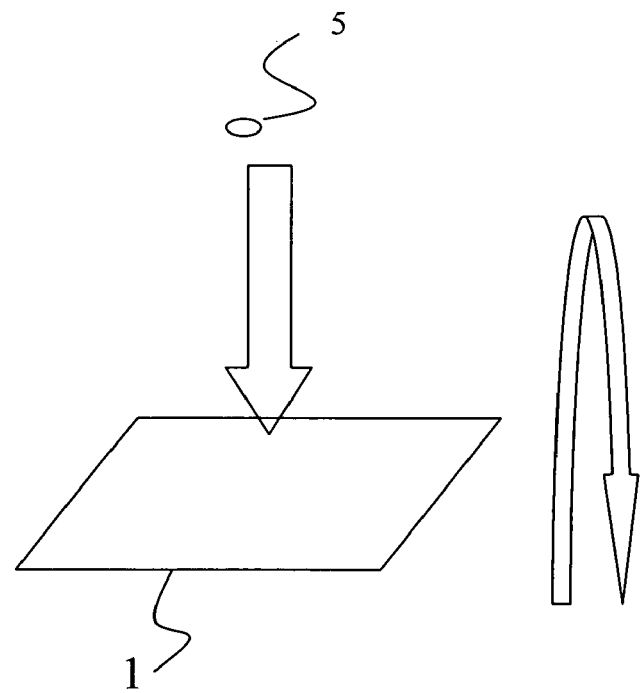
FIG. 2 is a schematic isometric diagram of a light or laser movable liquyid crystal and its rotation upon radiation by a light or laser source.

A light source (not shown) controls the plate 20 which consists of LMLCs. Referring back to FIG. 2, LMLCs can be rotated axially depending upon the angle of incidence of the light source incident upon the LMLCs. Therefore, angular momentum in a direction normal to the plane of the substrate can be created by a light source with the appropriate angle of incidence upon the plate 20.

A simple optomechanical switch comprised of LMLCs has been disclosed. The disclosed embodiment illustrates a simple binary 1X2 switch. It will be understood by those of ordinary skill in the art that the simple 1X2 switch can be configured for any mXn configuration. It will also be understood that the optical beam 60 can employ more states of data information than simple binary configuration. Additionally, with techniques such as Wave Division Multiplexing, the switch of the invention can be configured for limitless data transfer. It will be further understood that the switch of the invention is reversible.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An optomechanical switch for transmitting an optical beam comprising:
    a substrate;
    a light source capable of transmitting a radiation signal; and
    a light (or laser) movable liquid cryatal (LMLC) on said substrate positionable between a first position and a second position upon activation with said light source.

2. The optomechanical switch of claim 1 wherein said first position is a transmissive state for transmission of said optical beam.

3. The optomechanical switch of claim 2 wherein said second position is a reflective state for reflection of said optical beam.

4. The optomechanical switch of claim 1 wherein said substrate is silicon.

5. The optomechanical switch of claim 1 wherein said substrate is silicon on insulator.

6. The optomechanical switch of claim 1 wherein said substrate is a multi layer substrate.

7. The optomechanical switch of claim 1 wherein said light source is a laser.

8. The optomechanical switch of claim 1 wherein said LMLC is rotatably disposed with respect to said substrate.

9. An optomechanical switch for transmitting an optical beam comprising:
    a substrate;
    a signal source capable of transmitting a radiation signal;
    a light movable liquid crystal (LMLC) on said substrate positionable between a first position and second position upon activation with said signal source; and
    a micromirror hinged to said LMLC.

10. The optomechanical switch of claim 9 wherein said hinge is made of LMLCs.

11. The optomechanical switch of claim 9 wherein said first position is a transmissive state for transmission of said optical beam.

12. The optomechanical switch of claim 11 wherein said second position is a reflective state for reflection of said optical beam.

13. The optomechanical switch of claim 9 wherein said signal source is a light source.

14. The optomechanical switch of claim 9 wherein said signal source is a laser source.

* * * * *